United States Patent [19]
Lotfi et al.

[11] Patent Number: 5,925,827
[45] Date of Patent: Jul. 20, 1999

[54] SYSTEM AND METHOD FOR EMPIRICALLY DETERMINING SHRINKAGE STRESSES IN A MOLDED PACKAGE AND POWER MODULE EMPLOYING THE SAME

[75] Inventors: Ashraf W. Lotfi, Rowlett, Tex.; John D. Weld, Succasunna, N.J.

[73] Assignee: Lucent Technologies Inc., Murray Hill, N.J.

[21] Appl. No.: 08/938,619

[22] Filed: Sep. 25, 1997

Related U.S. Application Data

[51] Int. Cl.$^6$ ................................................ G01B 7/16
[52] U.S. Cl. ............................................. 73/799; 73/774
[58] Field of Search ........................... 73/762, 774, 779, 73/799

[56] References Cited

U.S. PATENT DOCUMENTS

| | | | |
|---|---|---|---|
| 3,184,963 | 5/1965 | Dahle | 73/779 |
| 4,890,084 | 12/1989 | Chu | 73/779 |
| 4,920,806 | 5/1990 | Obama et al. | 73/779 |
| 4,931,729 | 6/1990 | Pratt | 73/779 |
| 5,086,651 | 2/1992 | Westermo et al. | 73/779 |
| 5,142,227 | 8/1992 | Fish | 73/779 |
| 5,297,439 | 3/1994 | Tyren et al. | 73/779 |
| 5,502,381 | 3/1996 | Saitou | 73/779 |

OTHER PUBLICATIONS

U.S. Patent Application entitled "Encapsulated Package for Power Magnetic Devices and Method of Manufacture Therefor" Authors: A.W. Lotfi, J.D. Weld. K.E. Wolf and W.L. Woods: Filed on Feb. 21, 1996: U.S. Serial No. 08/604,637.

*Primary Examiner*—Max H. Noori

[57] ABSTRACT

A system for, and method of, empirically determining stress in a molded package and a power module embodying the system or the method. In one embodiment, the system includes: (1) a sensor, having a magnetic core exhibiting a known complex permeability in a control environment, that is embedded within the molded package and therefore subject to the stress and (2) a measurement circuit, coupled to the sensor, that applies a drive signal to the sensor, measures a response signal received from the sensor and uses the drive signal and the response signal to determine a complex permeability under stress of the core. The magnitude of the stress can then be determined from the core's complex permeability under stress.

14 Claims, 3 Drawing Sheets

SYSTEM AND METHOD FOR EMPIRICALLY DETERMINING SHRINKAGE STRESSES IN A MOLDED PACKAGE AND POWER MODULE EMPLOYING THE SAME

TECHNICAL FIELD OF THE INVENTION

The present invention is directed, in general, to power magnetics and, more specifically, to a system and method for empirically determining stresses (including shrinkage stresses) in a molded package (that may contain electronic components or magnetic devices) and a power module employing the system or the method.

BACKGROUND OF THE INVENTION

Magnetostriction is a phenomenon that occurs in magnetic materials such as ferrites, metals and alloys. Magnetization of the materials causes a change d1 in a dimension 1, creating a strain or magnetostriction $\lambda$ represented by $\lambda = d1/1$. Magnetostriction is a material constant that can be either negative or positive. A magnetic material exists in one of three states or regimes. Above a Curie temperature, the material is in a paramagnetic regime and exhibits no magnetization. Below the Curie temperature, the material may be in either a ferromagnetic regime or a saturation magnetization regime. In the ferromagnetic regime, spontaneous magnetization occurs in small, randomly ordered molecular magnetic domains throughout the material. The overall magnetization of the material is, however, zero. A strong magnetic field, sufficient to align all the molecular magnetic domains, may be applied to the material to place it in a saturation magnetization regime. In this regime, the alignment of the molecular magnetic domains produces a maximum length change in the material and provides a value for the saturation magnetostriction of the material.

Power modules are employed in many electronic devices to power the components therein. Power modules were initially available in through-hole packages consisting of a metal or plastic case, housing a printed wiring board (PWB) on which power module components were mounted.

Electronic components are currently migrating towards surface-mount packaging in overwhelming proportions. Board-mounted power modules will inevitably follow, if only to assure assembly compatibility with this packaging technology. Surface-mount assembly operations, however, typically involve severe reflow temperatures and wash (or cleaning) cycles that may damage components in the power modules. As a result, power module circuits are encapsulated in a rigid epoxy molding compound via, in most cases, a transfer molding process. As a dense glass-filled epoxy with a high glass transition temperature and a high modulus, the molding compound is capable of withstanding the high temperatures found in surface-mount assembly operations. During encapsulation, the molding compound completely fills around all the components in the power module circuits, creating a solid package for the power module and providing a good thermal path for heat generating components. The molding compound thus protects the power module circuits from surface-mount assembly operations.

The protection provided by the molding compound comes, however, at a cost. As the molding compound cools from a molding temperature to room temperature, it shrinks. Substantial thermal shrinkage stresses are thus imposed on the components in the power modules by the high modulus molding compound.

Power modules typically use ferrite materials [e.g., manganese zinc (MnZn)] as core materials in magnetic devices such as power transformers and energy storage inductors. As the molding compound shrinks and thermal shrinkage stresses are imposed on the ferrite materials, large strains are created, restricting the movements of the small, molecular magnetic domains during external magnetic field excitation. The required degree of alignment of the molecular magnetic domains cannot be achieved.

Strain pinning between the domain walls occurs, increasing dissipation in the ferrite materials. The ferrite materials, therefore, cannot fully enter the saturation regime. A pronounced decrease in the magnetic properties results, with a corresponding degradation in performance of the magnetic devices (e.g., power transformers and energy storage inductors). As described in U.S. Ser. No. 08/604,637 filed on Feb. 21, 1996, "Encapsulated Package for Power Magnetic Devices and Method of Manufacture Therefor," magnetic devices containing ferrite materials, therefore, must be protected from the thermal shrinkage stresses of the molding compound to retain full functionality in surface-mount power modules or power modules in general.

Since the transfer molding process is widely used in packaging integrated circuits, a determination of molding stresses in the packages during molding is necessary to the design of a long-life and robust package. Precise knowledge of thermal shrinkage stresses is also necessary in the development of protection schemes for the ferrite materials used in power modules.

Knowledge of thermal shrinkage stresses in a molded package is typically obtained through analytical models and determined by conventional stress analysis or finite element analysis. This knowledge, however, is only theoretical. It would be advantageous therefore, to measure the shrinkage stresses during the three stages of molding (i.e., filling, packing and cooling).

Accordingly, what is needed in the art is a method of empirically determining the stresses (including shrinkage stresses) present in a molded package.

SUMMARY OF THE INVENTION

To address the above-discussed deficiencies of the prior art, the present invention provides a system for, and method of, empirically determining stress in a molded package and a power module embodying the system or the method. In one embodiment, the system includes: (1) a sensor, having a magnetic core exhibiting a known complex permeability in a control environment, that is embedded within the molded package and therefore subject to the stress and (2) a measurement circuit, coupled to the sensor, that applies a drive signal to the sensor, measures a response signal received from the sensor and uses the drive signal and the response signal to determine a complex permeability under stress of the core and a magnitude of the stress therefrom.

The present invention therefore introduces the broad concept of embedding a sensor in a molded package to empirically determine the amount of stress present in the package. Feedback from stress measurements allows component designs (e.g., inductor parameters such as protection, gap, turns, etc.) to be adjusted to compensate for magnetostrictive effects. Once modifications are made during product development and design, regular stress measurements made during manufacturing will allow monitoring of the molded product. Excessive stresses leading to a failed component may thus be detected at the molding stage rather than at a later stage after other value-added operations have been performed.

In one embodiment of the present invention, the sensor further has drive and sense windings located proximate the core, the drive winding receiving the drive signal and the sense winding generating the response signal. Alternatively, the sensor may have only one winding, in which case self-induction, as influenced by the permeability of the core, produces the response signal.

In one embodiment of the present invention, the molded package contains a power module and the sensor is integrated into a power train of the power module. In a more specific embodiment, the sensor is selected from the group consisting of: (1) a transformer in the power module and (2) an inductor in the power module. Thus, the present invention may be separate from other circuitry embedded in the molded package or may employ a magnetic device preexisting in the circuitry to perform stress determination.

In one embodiment of the present invention, the core is composed of a ferrite. In a more specific embodiment, the core is composed of manganese zinc (MnZn) ferrite. Those skilled in the art will understand, however, that the present invention is operable with all materials that are subject to magnetostriction.

In one embodiment of the present invention, the measurement circuit is located in the molded package. Of course, the measurement circuit can be located outside of the molded package.

In one embodiment of the present invention, the sensor and measurement circuit are operable during a molding of the molded package. This allows stress to be measured throughout the molding process, providing valuable insight into optimal production techniques. However, such capability is not necessary to the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
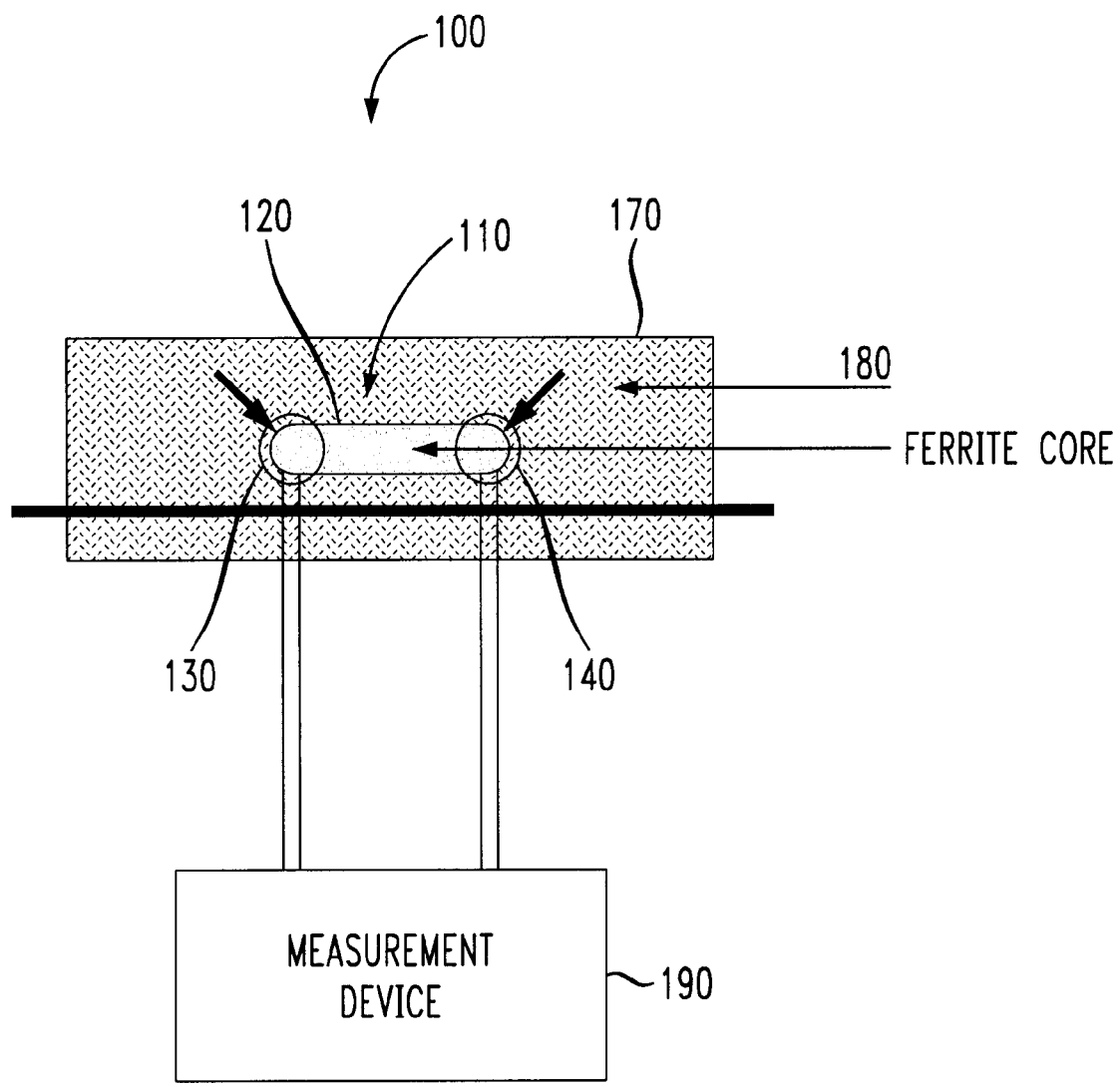
FIG. 1 illustrates a cross-sectional view of a stress determination circuit for empirically determining shrinkage stress constructed according to the principles of the present invention.

Referring initially to FIG. 1, illustrated is a cross-sectional view of a stress determination circuit 100 for empirically determining shrinkage stress constructed according to the principles of the present invention. The stress determination circuit 100 includes a sensor 110 embedded within a molded package 170 by a molding compound 180. The stress determination circuit 100 further includes a measurement circuit 190, coupled to the sensor 110 that determines a complex permeability (having real and imaginary permeability components) under stress of the sensor 110. The sensor 110, in the illustrated embodiment, consists of a toroidal ferrite core 120, having a primary (drive) winding 130 and a secondary (sense) winding 140 through its center hole.

In the illustrated embodiment, the toroidal ferrite core 120 is composed of MnZn ferrite having an initial real permeability in the range of 1000 to 3000. Although the illustrated embodiment uses a MnZn toroidal ferrite core 120, those skilled in the art should realize that the use of any magnetostrictive material to measure shrinkage stress falls within the broad scope of the present invention.

Figure 2:
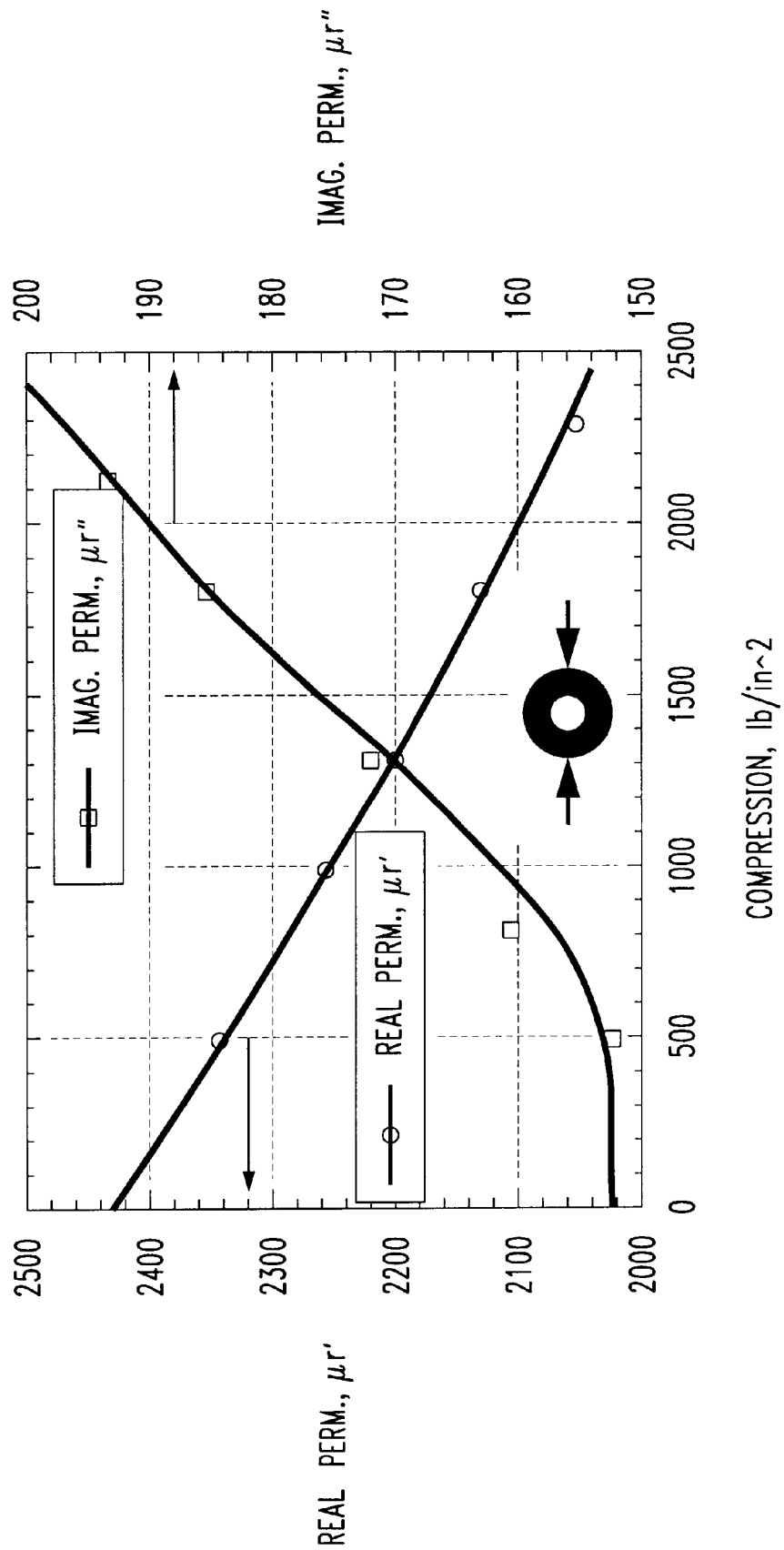
FIG. 2 illustrates a graphical representation of a stress dependence of a complex permeability of the toroidal ferrite of FIG. 1.

Turning now to FIG. 2, illustrated is a graphical representation of a stress dependence of a complex permeability of the toroidal ferrite core 120 of FIG. 1. Complex permeability is a combination of two components: a real permeability $\mu r'$ and an imaginary permeability $\mu r''$. The real permeability $\mu r'$ decreases monotonically as compression stresses are applied to the toroidal ferrite core 120. In contrast, the imaginary permeability $\mu r''$ increases as compression stresses are applied. The compression stresses on the toroidal ferrite core 120 may therefore be determined by measuring the real and imaginary permeability $\mu r'$, $\mu r''$.

With continuing reference to FIG. 1, the stress determination circuit 100 operates as follows. Before molding, the toroidal ferrite core 120 is calibrated by measuring its unstressed complex permeability in a control environment (which is preferably relatively stress-free and most preferably free air).

In one embodiment of the present invention, the measurement circuit 190 applies a drive signal to the toroidal ferrite core 120, measures a response signal from the toroidal ferrite core 120, and uses the drive signal and the measured response signal to determine the complex permeability of the toroidal ferrite core 120.

A preferred embodiment of the present invention uses a conventional impedance measurement technique to determine the complex permeability of the toroidal ferrite core 120. The measurement circuit 190 produces, using conventional processes, a drive voltage of a known magnitude and phase. The drive voltage is then applied to the primary (drive) winding 130. The measurement circuit 190 then measures, using conventional processes, a magnitude and phase of a resulting sensed current generated by the secondary (sense) winding 140 of the sensor 110. The measurement circuit 190 can thus compare the drive voltage to the sensed current to determine the complex permeability of the toroidal ferrite core 120.

In a preferred embodiment, the measurement circuit 190 may use analog to digital converters to convert the magnitude and phase of both the drive and the sensed signals to digital signals. The complex permeability of the toroidal ferrite core 120 may then be computed. Of course, the measurement circuit 190 may also be performed by analog circuitry.

Alternatively, the complex permeability of the toroidal ferrite core 120 may be measured using conventional B-H loop measurements. B-H loop measurements are familiar to those skilled in the art, and, as a result, will not be described.

The measurement circuit 190 may, in one embodiment of the present invention, be located in the molded package 170.

Of course, the measurement circuit 190 may also be located outside of the molded package 170.

During the three molding steps of filling, packing and cooling, the sensor 110 may be measured again to determine empirically the shrinkage stresses imposed on the toroidal ferrite core 120. Again, conventional methods for determining the complex permeability (e.g., impedance measurement, B-H loop measurement) may be used.

In a preferred embodiment, the measurement circuit 190 again applies the drive voltage to the primary (drive) winding 130. The molecular magnetic domains within the toroidal ferrite core 120, however, are restricted by the shrinkage stresses and therefore cannot achieve the required alignment. The measurement circuit 190 may then measure the magnitude and phase of the sensed current through the toroidal ferrite core 120 at the secondary (sense) winding 140. The drive voltage may then be compared to the sensed current to determine the complex permeability under stress of the toroidal ferrite core 120. The magnitude of the molding stresses imposed by the molding compound 180 in the vicinity of the sensor 110 may thus be derived. Those skilled in the art should realize, of course, that the operability of the sensor 110 and measurement circuit 190 during the molding of the molded package 170 is not necessary to the broad scope of the present invention.

Figure 3:
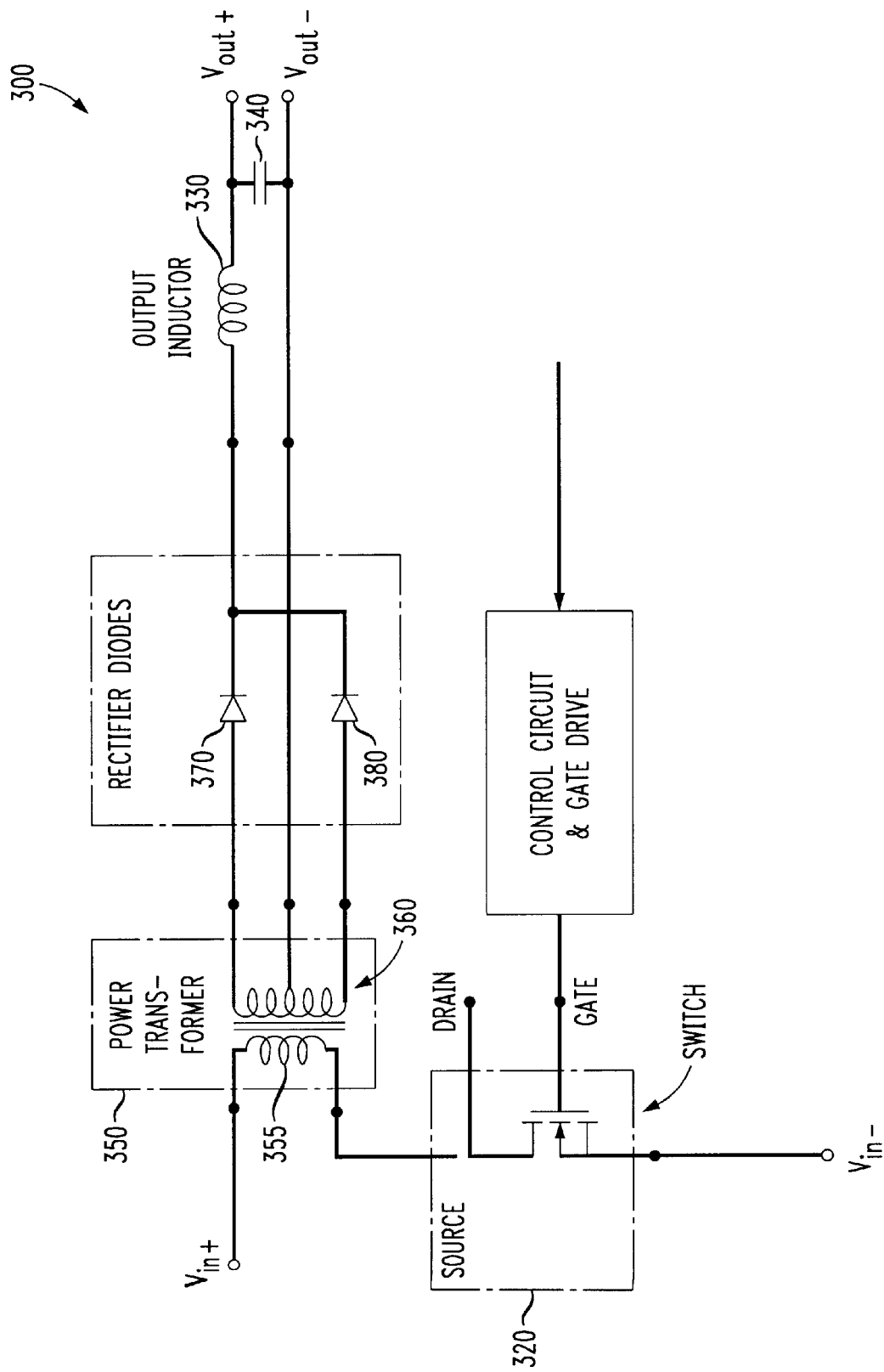
FIG. 3 illustrates a schematic diagram of a power supply employing a sensor constructed according to the principles of the present invention.

Turning now to FIG. 3, illustrated is a schematic diagram of a power module 300 employing a sensor constructed according to the principles of the present invention. The power module 300 includes a power train having a conversion stage (not separately referenced) including a power switching device 320 for receiving input electrical power $V_{IN}$ and producing therefrom switched electrical power. The power module 300 further includes a filter stage (not separately referenced, but including an output inductor 330 and output capacitor 340) for filtering the switched electrical power to produce output electrical power (represented as a voltage $V_{OUT}$).

The power module 300 further includes a power transformer 350, coupled to the conversion stage, having a ferrite core, a primary (drive) winding 355 and a secondary (sense) winding 360. The power module 300 still further includes a rectifier (including rectifying diodes 370, 380) coupled between the conversion stage and the filter stage. The power module 300 is embedded in a molded package by a molding compound (not shown).

The power module 300 further includes a stress determination circuit for empirically determining stress in the molded package. The stress determination circuit includes a sensor and a measurement circuit. The sensor may be integrated into the power train of the power module 300. In the illustrated embodiment of the present invention, the power transformer 350 may perform the function of the sensor. The power transformer 350 contains a ferrite core that is adversely affected by molding stresses exhibited by the molding compound. Prior to molding, a complex permeability of the power transformer 350 (consisting, as described above, of real and imaginary permeability components) may be characterized in free air. After molding, the complex permeability of the power transformer 350 may again be measured. As the molding compound thermally shrinks, imposing stresses on the ferrite core, the real permeability monotonically decreases. A method of indirectly measuring the stresses acting on the ferrite core of the power transformer 350 is thereby provided. Of course, the output inductor 330, with its ferrite core and the addition of a second (drive or sense) winding, may also perform the function of the sensor. Again, the power transformer 350 and power module 300 are submitted for illustrative purposes only and the use of the sensor in other devices and applications are well within the broad scope of the present invention.

For a better understanding of power electronics including power supplies and conversion technologies, see "Principles of Power Electronics," by J. G. Kassakian, M. F. Schlecht and G. C. Verghese, Addison-Wesley (1991). For a better understanding of magnetic devices and construction techniques therefor, see "Handbook of Transformer Applications," by William Flanagan, McGraw Hill Book Co. (1986). The aforementioned references are incorporated herein by reference.

Although the present invention has been described in detail, those skilled in the art should understand that they can make various changes, substitutions and alterations herein without departing from the spirit and scope of the invention in its broadest form.

What is claimed is:

1. A system for empirically determining stress in a molded package, comprising:

a sensor, having a magnetic core exhibiting a known complex permeability in a control environment, that is embedded within said molded package and therefore subject to said stress; and a measurement circuit, coupled to said sensor, that applies a drive signal to said sensor, measures a response signal received from said sensor and uses said drive signal and said response signal to determine a complex permeability under stress of said core and a magnitude of said stress therefrom.

2. The system as recited in claim 1 wherein said sensor further has drive and sense windings located proximate said core, said drive winding receiving said drive signal and said sense winding generating said response signal.

3. The system as recited in claim 1 wherein said molded package contains a power module and said sensor is integrated into a power train of said power module.

4. The system as recited in claim 3 wherein said sensor is selected from the group consisting of:

a transformer in said power module, and an inductor in said power module.

5. The system as recited in claim 1 wherein said core is composed of a ferrite.

6. The system as recited in claim 1 wherein said measurement circuit is located in said molded package.

7. The system as recited in claim 1 wherein said sensor and measurement circuit are operable during a molding of said molded package.

8. A method for empirically determining stress in a molded package, comprising the steps of:

subjecting a sensor embedded within said molded package to said stress, said sensor having a magnetic core exhibiting a known complex permeability in a control environment;

applying a drive signal to said sensor;

measuring a response signal received from said sensor;

using said drive signal and said response signal to determine a complex permeability under stress of said core; and deriving a magnitude of said stress from said complex permeability under stress.

9. The method as recited in claim 8 wherein said sensor further has drive and sense windings located proximate said core, said step of causing comprising the step of providing said drive signal to said drive winding, said step of measuring comprising the step of generating said response signal in said sense winding.

10. The method as recited in claim 8 wherein said molded package contains a power module and said sensor is integrated into a power train of said power module.

11. The method as recited in claim 10 wherein said sensor is selected from the group consisting of:

a transformer in said power module, and an inductor in said power module.

12. The method as recited in claim 8 wherein said core is composed of a ferrite.

13. The method as recited in claim 8 wherein said measurement circuit is located in said molded package.

14. The method as recited in claim 8 further comprising the step of operating said sensor and measurement circuit during a molding of said molded package.

* * * * *